Aug. 5, 1941.  E. S. PATCH ET AL  2,251,465
LUBRICATING SYSTEM
Filed Nov. 26, 1937
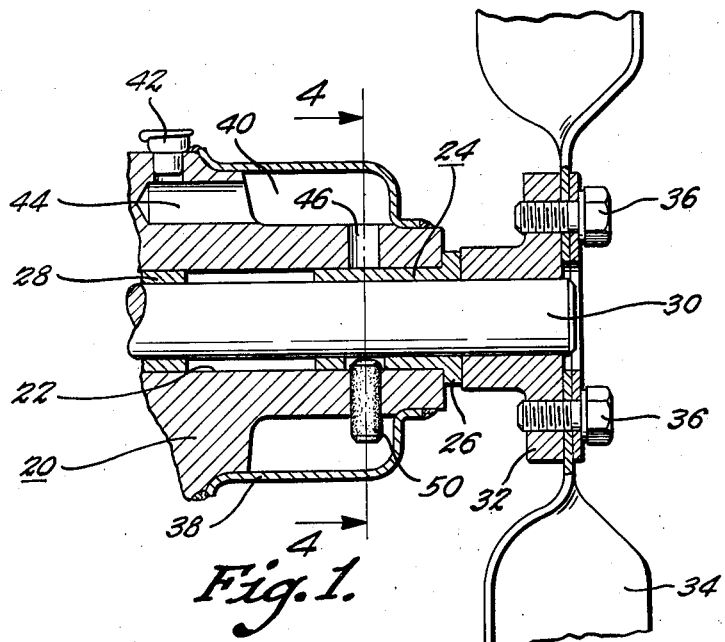
Fig. 1.
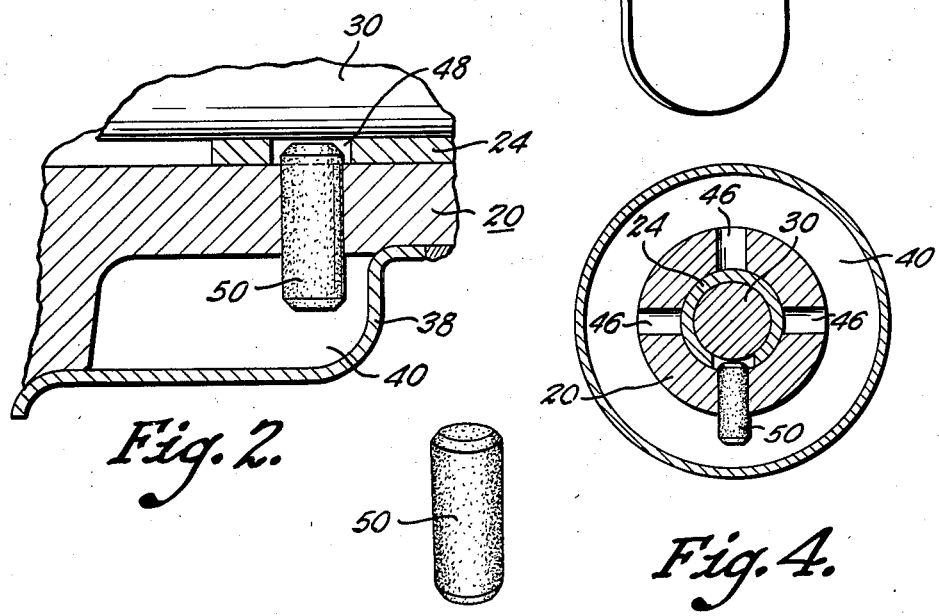
Fig. 2.
Fig. 3.
Fig. 4.
INVENTORS
Earl S. Patch
Jean A. Lignian
their ATTORNEYS Patented Aug. 5, 1941

2,251,465

UNITED STATES PATENT OFFICE 2,251,465

LUBRICATING SYSTEM

Earl S. Patch and Jean A. Lignian, Dayton, Ohio, assignors to General Motors Corporation, Detroit, Mich., a corporation of Delaware Application November 26, 1937, Serial No. 176,490

3 Claims. (Cl. 308—121)

The present invention relates to lubricating systems and more particularly to lubricating systems that employ porous metal wicks for feeding the lubricant to the bearing surfaces.

One of the objects of the present invention is to provide a lubricating system for a bushing, which is used as a journal for a rotating shaft, a highly porous metal wick being employed to feed lubricant from a reservoir to a cavity at the inner bearing surface of the bushing.

Another object of the present invention is to provide means for feeding lubricant at a controlled rate of flow to the bearing surface of a bearing element, whereby adequate lubrication is provided at said surface without excessive use of lubricant.

In carrying out the above objects, it is still a further object of the invention, when a porous metal bushing is utilized, to furnish one or more lubricant ducts communicating to the outer surface of the bushing whereby oil from the oil reservoir may enter the bushing from the outer surface thereof, and be fed therethrough by capillary action within the inter-communicating pores of the porous metal bushing, the aforementioned highly porous wick being utilized to supply a superficial film of lubricant to the bearing surface only.

It is a still further object of the invention to provide means for lubricating a porous metal bushing at the inner bearing surface thereof whereby said bushing is adequately lubricated even though the inter-communicating pores at the bearing surface of the bushing have been partially closed thereby preventing adequate self-lubrication of the bushing.

Another object of the invention is to provide an oil cavity at the inner surface of a porous metal bushing, said cavity being positioned within the bushing preferably adjacent the leading edge of the area of greatest load.

Further objects and advantages of the present invention will be apparent from the following description, reference being had to the accompanying drawing wherein a preferred embodiment of the present invention is clearly shown.

In the drawing:

Fig. 1 is a fragmentary view, in section, of one form of the present invention, as applied to a water pump assembly, or the like.

Fig. 2 is an enlarged fragmentary view illustrating a porous metal wick and its disposal within an oil cavity in a bushing.

Fig. 3 is an enlarged view illustrating one embodiment of the porous metal wick as utilized in the present invention, and, Fig. 4 is a view taken on line 4—4 of Fig. 1.

Porous metal bushings are often termed self-lubricating bushings due to the fact that such bushings are usually impregnated with oil prior to their application as shaft journals. Such oil impregnated bushings due to the inter-communicating pores therein feed the oil which is held within the pores thereof by capillarity to the bearing surfaces. This oil feeding process is slow since the usual porosity of the bushing is between 15 and 20 percent by volume, and therefore the oil which is held within the bushings lubricates the same for long periods of time. It is common practice to provide such porous metal bushings with an external oil reservoir which communicates with the outer surfaces thereof and thereby constantly replenishes the oil supply within the porous metal of the bushings as the oil is slowly fed to the bearing surfaces. Such practice is clearly illustrated in the patents to Patch No. 1,873,146, and Short 1,912,101.

It has been found by exhaustive tests that when such a bushing is utilized as a shaft journal, in mechanisms wherein the external construction thereof produces elevated temperatures during operation, that such increase in temperature is conducted to the bushing, either by the shaft or by the bushing housing. This increase in temperature at the bushing has, in some cases, carbonized the oil within the pores of the porous metal bushing and thereby reduced the porosity of the bushing and lessened the self lubricating effect thereof.

The present invention is directed to a lubricating system that makes use of all the inherent lubricating qualities of a porous metal bushing and which also includes, means for independently providing additional lubrication for the inner bearing surface sufficient to maintain adequate lubrication thereof in the event that the porous metal bushing loses some of its inherent lubricating qualities as previously explained.

Porous metal bushings as referred to herein may be fabricated by various processes, one of such processes being described in the Williams Patent No. 1,556,658, which is specifically directed to porous bronze bushings.

Referring to the drawing, Fig. 1 shows a fragmentary view of a conventional type of a water pump assembly which includes a bushing support 20. The support 20 is machined to provide a smooth bore 22 therethrough into which is pressed a flanged porous metal thrust bushing 24.

One surface of the flanged portion 26 of the bushing 24 is disposed to abut the support member 20 when the bushing 24 is pressed in place and the opposite surface thereof acts as a thrust bearing to be described hereinafter. A second bushing 28 may also be provided at the other end of the bore 22 if desired. A shaft 30 is journaled within the bushings 24 and 28 and carries a hub 32 disposed at the outer end thereof, which hub 32 is suitably secured to the shaft 30. An end surface of the hub 32 abuts the thrust surface of flange portion 26 of the bushing 24 and thereby prevents excessive end play of the shaft 30 when the assembly is complete. The hub 32 may carry a pulley (not shown) and a fan 34, which elements are preferably bolted thereto by a plurality of bolts 36 that are threaded directly into the hub 32.

An annular metal cup 38 of suitable dimensions is pressed over the support 20 as noted in Fig. 1 and thereby forms a reservoir 40 between the inner walls of the cup 38 and the enclosed walls of housing 20. The cup 38 may be suitably joined to the support 20 as by brazing or welding to make the reservoir 40 fluid-tight. An oil cup 42 positioned in the support 20 communicates with the reservoir 40 through a passage 44 and is used as a means for introducing oil into the reservoir 40.

The wall portion of support 20, which carries and surrounds bushing 24, is preferably drilled to provide a plurality of oil ducts 46 therearound. The ducts 46 communicate to the outer surface of the bushing 24 and are used as lubricating channels for conducting lubricant from the reservoir 40 to the outer surface of the bushing 24.

Referring to Fig. 2 it will be noted that a cavity 48 is formed by drilling through the bushing 24 which cavity is disposed to register with one of the ducts 46. The cavity 48 is preferably of greater diameter than the diameter of the communicating ducts 46. A highly porous metal wick 50 of substantially the same diameter as the ducts 46 is pressed through the duct 46 that registers with the cavity 48. In certain installations, where high loading is imposed on the bushing, it is preferable to position the cavity 48 adjacent the leading edge of the area of greatest load. In this manner the shaft seals the cavity 48 when the bushing becomes slightly worn. In general however, the cavity 48 is positioned substantially as shown in the drawing. The wick 50 extends within the cavity but preferably does not rub against the shaft 30. The cavity 48 being of slightly greater diameter than the wick 50 may be filled with oil as fed thereto by the wick 50 and thereby provide an oil supply for the inner bearing surface of the bushing 24. The highly porous metal wick 50 can be fabricated in much the same manner as the porous metal bushings. If high porosity is desired the briquetting or compacting step of the Williams process can be eliminated and the loose non-compacted powders can be sintered to form a highly porous mass, such procedure being clearly disclosed in application Serial No. 145,747, assigned to the assignee of the present invention. Such wicks can be fabricated from any suitable powdered metals such as, copper, tin or iron powders or combinations thereof, and have a porosity up to 50% by volume. Wicks made by this process may be compacted to any desired degree of porosity after the sintering step of the process.

The wick 50 feeds oil to cavity 48 by capillarity which is usually aided by fluid pressure of the oil, since the oil usually stands at a level within the reservoir 40 above the highest point within the cavity 48. Still another factor contributes to the oil feeding of the wick 50, such a factor residing in the pumping action of the rotating shaft 30. This is explained as follows: the shaft 30 being fabricated from metal is not perfectly smooth at the surface thereof, but in reality is comprised of a multiplicity of minute irregular portions which, when the shaft is rotated, act in a manner similar to the vanes of a rotary pump and thereby exhaust oil from the cavity 48 and distribute the same around the bearing surface of the shaft journal, while simultaneously causing a slight vacuum within the cavity 48. It is apparent that additional oil will be supplied by the wick 50 to the cavity 48 to satisfy this low pressure condition, and thereby reestablish equilibrium conditions therein. Due to the surface tension of the oil, the same is held within the bushing 24, and does not waste from the ends thereof either during rotation of the shaft or during idle periods of the assembly. This surface tension effect also prevents excessive feeding of the oil by the wick 50 to the cavity 48, since when the cavity 48 is substantially full and the bearing surfaces completely lubricated the surface tension effect therein creates a pressure minutely in excess of atmospheric pressure to prevent further feeding of oil to the cavity 48.

The present invention utilizing a porous metal wick provides a metered oil flow to the inner bearing surface of the bushing 24. Simultaneously, if desired, the ducts 46 supply oil to the outer surface of the bushing 24 which oil slowly seeps through the porous metal structure of the bushing to the inner bearing surface thereof. We are aware that prior patents such as the patent to Neale 1,687,780 disclose the use of porous metal plugs as flow metering devices, the present invention however not only utilizes this metering feature, but also uses the highly porous metal wick as a means for carrying the lubricant to a supply recess, which is open at the bearing surface.

The use of the porous metal wick has many advantages from a production standpoint since the porosity of such wicks may be closely controlled during fabrication thereof to provide a metered oil flow therethrough of any suitable quantity. Furthermore such wicks are substantially indestructible and when pressed in place as hereinbefore described give complete assurance that oil will be fed to the cavity 48 whenever the oil supply therein is depleted. Then too, such a wick does not char or otherwise deteriorate under substantially high temperature conditions as might be encountered in certain types of installations.

While the hereinbefore described lubricating system has been illustrated in connection with a water pump it is apparent that the same can be used satisfactorily and with the same degree of success on any type of shaft journal. Similarly while the descriptive matter herein has been directed to the lubrication of porous metal bushings, such an oil feed can be used with other types of bushings such as conventional types of bronze or Babbitt bushings, etc., which are not of a porous nature.

While the embodiment of the present invention as herein disclosed, constitutes a preferred form, it is to be understood that other forms might be adopted, all coming within the scope of the claims which follow.

What is claimed is as follows:

1. A lubricating system comprising in combination, a shaft, a horizontal bushing disposed to act as a bearing for said shaft, a support for carrying the bushing, a cavity within the bushing terminating in an aperture at the bearing surface thereof, oil metering means extending vertically into said cavity and comprising a highly porous metal part made from sintered non-compacted metal powders, said means being so dimensioned as to only partially fill said cavity, an oil reservoir communicating with said means and adapted to hold oil for lubricating said bushing, said means feeding a metered quantity of oil to said cavity by capillarity within the pores thereof.

2. A lubricating system comprising in combination, a bushing support, a tubular bushing carried by said support and adapted to act as a bearing for a shaft, an oil cavity adjacent the lowest portion of the bushing and comprising a recess in said bushing and extending therethrough into communication with the shaft surface; a vertically disposed highly porous metal wick having one end thereof extending through said support and into said cavity and terminating below the inner bushing surface, said wick being of relatively smaller diameter than said cavity; and an oil reservoir communicating with the other end of said wick and extending upwardly to a point above the said bushing, whereby oil is fed to said cavity by capillarity and by fluid pressure, through said wick.

3. A lubricating system comprising in combination, a shaft, a bushing disposed to act as a bearing for said shaft, a cavity formed within the bushing and adjacent the lowest portion thereof consisting of a recess in the bushing and extending therethrough in communication with the shaft surface, a vertically disposed highly porous metal wick having one end thereof extending into said cavity, said wick being of relatively smaller diameter than said cavity, and an oil reservoir communicating with the opposite end of said wick and extending upwardly to a point above said cavity, said wick feeding oil to said cavity from said reservoir by capillarity.

EARL S. PATCH.
JEAN A. LIGNIAN.